Jan. 19, 1965  B. B. LEVITT  3,165,933
PNEUMATIC INERTIAL SENSOR
Filed July 8, 1963  2 Sheets-Sheet 1

INVENTOR.
Ben B. Levitt
BY
Richard J. Miller
Atty.

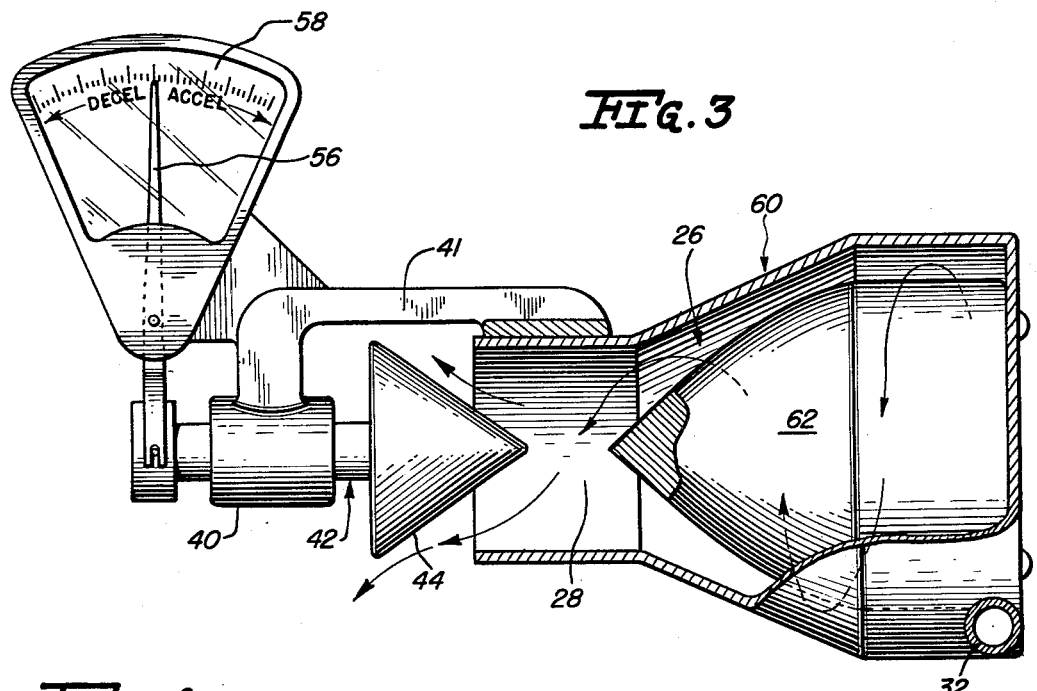
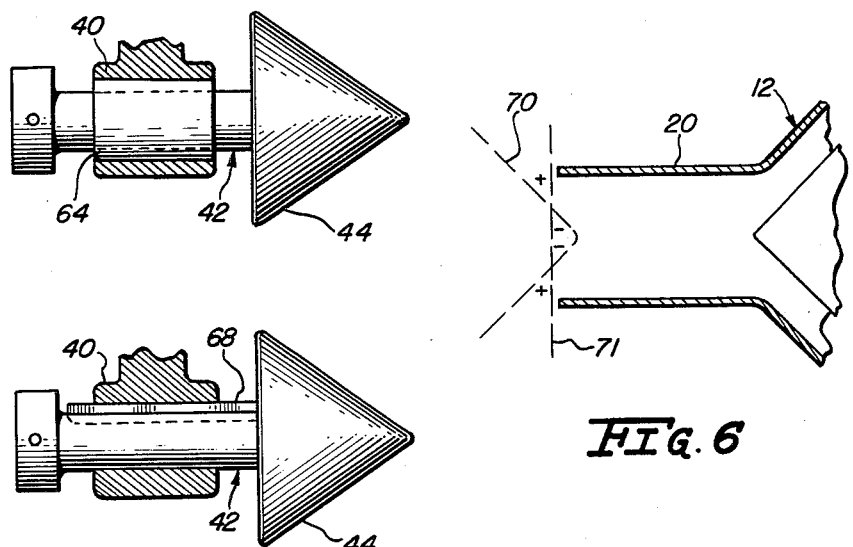

United States Patent Office 3,165,933
Patented Jan. 19, 1965

3,165,933
PNEUMATIC INERTIAL SENSOR
Ben B. Levitt, Norfolk, Va.
(835 NW. 7th St. Road, Miami, Fla.)
Filed July 8, 1963, Ser. No. 293,567
13 Claims. (Cl. 73—515)
(Granted under Title 35, U.S. Code (1952), sec. 266)

The invention described herein may be manufactured and used by or for the Government of the United States of America for governmental purposes without the payment of any royalty thereon or therefor.

This invention relates to inertial sensors and more particularly to pneumatic inertial sensors.

It is an object of the invention to provide an improved inertial sensor which is substantially unaffected by high temperature and high nuclear radiation environments.

Another object is to provide inertial sensor characterized by light weight, a minimum of moving parts, maximum reliability, compactness, simplicity, and durability.

Other objects, advantages and novel features of the invention will become apparent from the following detailed description of the invention when considered in conjunction with the accompanying more or less schematic drawing, wherein:

FIG. 3 is similar to FIG. 1 but shows a modification.

FIG. 4 is a fragmentary view showing the inertial element mounted for rotary and axial movement.

FIG. 5 is similar to FIG. 4 but shows the inertial element limited to axial movement.

FIG. 6 is a schematic representation showing the vortex pressure profile at the exhaust region.

Figure 1:
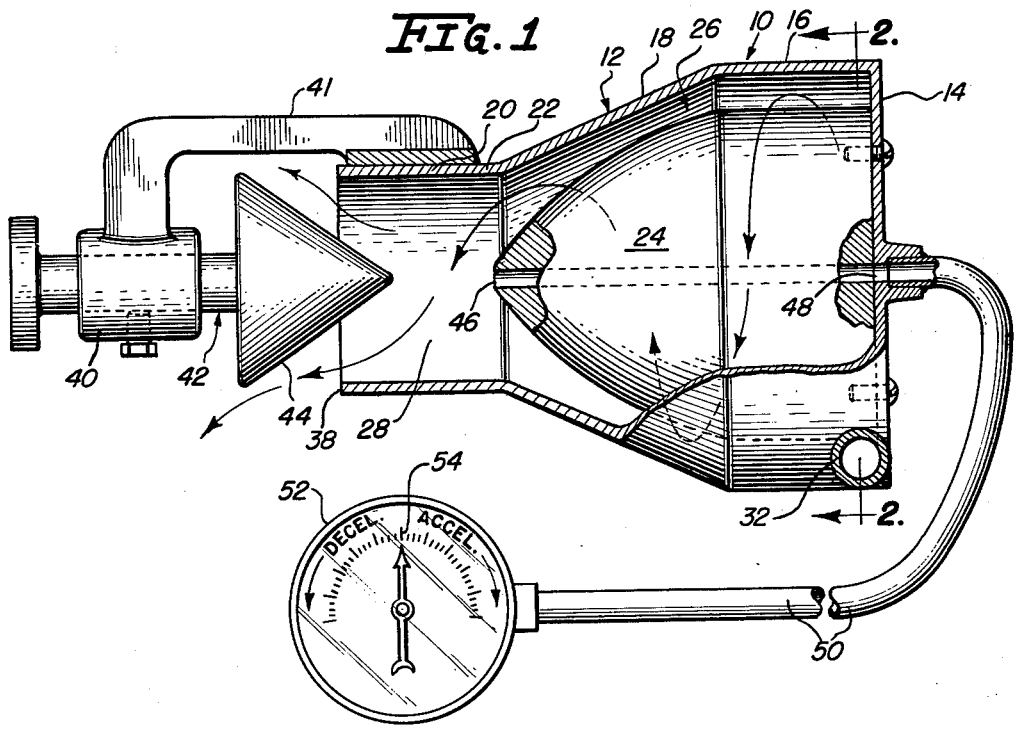
FIG. 1 is a longitudinal view, partly in section and partly in elevation, showing one form of the invention.
Figure 2:
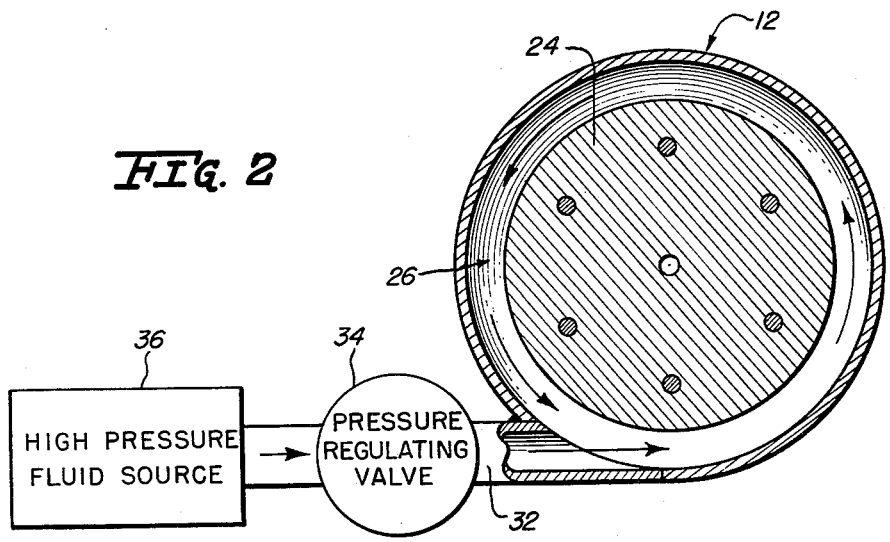
FIG. 2 is a view, partly in section and partly in elevation, taken as indicated at 2—2 in FIG. 1.

Referring more particularly to the drawing, depicting preferred embodiments of the invention, and more particularly to the form of inertial sensor apparatus indicated generally at 10 (FIG. 1), there is shown a cup 12 having a base 14, a cylindrical wall portion 16 extending from the base, a frusto-conical wall portion 18 converging away from the base, and a cylindrical portion 20 extending from the narrow end 22 of the converging portion. A member such as a cone-like body 24 entirely within and coaxial with the cup 12 is fixed at its base to the cup base 14, and has its apex end adjacent the plane of the narrow end 22 of the cup wall portion 18. The body 24 defines with the cup 12 annular space 26 conically expanded away from the cup base 14 and merging with the circular space 28 defined essentially by the cup rim portion 20.

An inlet 32 tangent to the cup base portion of the annular space 26 is connected through a pressure regulator 34 to a high pressure fluid source 36. The fluid enters the inlet 32 at constant high pressure and thence swirls rapidly in and spirally along the annular space 26, taking the form of a high speed vortex in the circular space 28, and exhausting at the rim 38 of the cup 12.

A support 40 held, as by a suitable bracket 41 in fixed relation to the cup 12 carries an element 42 coaxial with the cup 12 and capable of movement (under certain circumstances, as will appear) relative to the cup along the cup axis. The element 42 has a conical formation 44 whose apex portion projects into the space 28 but in all operative positions is spaced from the body 24. If the dynamic forces acting axially on the system or apparatus 10 are in balance, the vortex will hold the element 42 in a null position, which may be assumed to be the position shown in FIG. 1. However, an inertial force acting in either direction along the axis of the cup 12 will correspondingly displace the element 42 axially from its null position.

The magnitude and direction of an applied inertial force, and hence the resulting displacement of the element 42, may be ascertained in accordance with the invention in various ways, as will appear.

It is characteristic of vortex flow that in the region of its axis the pressure is low, and that the pressure increases with the radius. In accordance with the invention the speed of the vortex is held constant. So long as the element 42 is axially stationary, the pressure gradient from axis to periphery of the vortex does not vary. Other things being equal, the entire pressure gradient will rise and lower respectively with increased and decreased immersion of the cone 44 in the vortex, the relationship being readily obtainable by calibration. Accordingly, the pressure at a given radius in the vortex will be an analog of the inertial status of the element 42.

A construction suitable for sensing the pressure in a part of the vortex is shown in FIG. 1, wherein the cup base 14 and body 24 are formed with coaxial bores 46 and 48 establishing, by means of a tube 50, communication between a pressure gage 52 and the axis portion of the space 28, the pressure indicated at 54 corresponding to the null position of the element 42.

If desired, the base 14 and body 24 could be imperforate and the rim wall portion 20 formed with a hole (not shown) by which a tube like the tube 50 would establish communication between a pressure gage and the periphery of the space 28.

Instead of sensing variations in vortex pressures to determine the inertial status of the element 42, this objective may be achieved by directly sensing the axial displacement of the element. To this end (FIG. 3) a member such as a lever 56, swingable in response to axial movement of the element 42, could be employed to multiply axial movement of the element and show the result on a suitable indicator 58. In such an arrangement the cup 60 and cone-like member 62 are like the cup 12 and member 24 but are axially unbored.

The element 42 may be supported in a bearing 64 (FIG. 4) which permits free rotation as well as axial movement of the element, or the element may be keyed as at 68 (FIG. 5) to its support 40 so as to be limited to axial movement. To prevent the element 42 from falling free or from otherwise moving axially beyond design limits, a suitable restraint may be employed. For this purpose the element 42 may be formed to straddle the support 40, as shown.

Transistors, vacuum tubes, wiring, and other electrical or electronic components are incapable, without expensive and complex protective means, of withstanding temperatures above 200° C. and high nuclear radiation. As embodiments of the invention are devoid of such components, the invention is peculiarly suited for use in such environments. For such purposes the several parts of the apparatus forming the subject matter of this invention may be made of tungsten, molybdenum, zirconium, or suitable alloys known to be inert to such environments.

The fluid entering the cup 12 at high pressure may be a gas generated from a hot gas generation system, and thus may be bled from the exhaust gases of propulsion of a rocket, or supplied from a hot gas stabilization and control system, or fed from a compressed gas container carried by the missile equipped with the invention. The rocket exhaust gas temperatures generally exceed about 200° C., and are emitted at pressures on the order of 2000 to 5000 p.s.i.

The invention requires a minimum of moving parts, the several parts are simple in design and assembly, and the invention is entirely compatible with a hot gas system.

It is noted that the inertial effect of gravity due to a change in attitude of the device could be corrected for in various ways. For example, inasmuch as such an effect would be a simple trigonometric function of the displacement angle, the sensing system could include means providing a compensating signal varying with the trigonometric function. However, such inertial effect would likely be so small compared to the other measured inertial forces, as to be lost in the "noise" of the system, rendering correction unnecessary.

The vortex pressure profile (pressure distribution pattern) at the exhaust region should take the general form indicated by the dot-dash curve 70 in FIG. 6, the areas of positive and negative pressure being indicated by the respective + and − signs, and the plane indicated by the broken line 71 is considered as the plane of zero relative or datum pressure. Numerical values for the pressure distribution pattern will depend on a number of variables including inlet and exhaust pressures, geometry of the device, properties of the working fluid and the like.

Preferably, and to insure maximum efficiency in the operation of the device, the cone 44 should be shaped to correspond substantially to the expected vortex pressure profile 70. This will preclude the generation of unnecessary turbulence in the vortex and consequent inefficiency in the operation of the system.

Obviously many modifications and variations of the invention are possible in the light of the above teachings. It is therefore to be understood that within the scope of the appended claims the invention may be practiced otherwise than as specifically described.

I claim:

1. In an inertial sensor:
   (a) means providing a vortex,
   (b) an element having a face thereof directed towards said vortex and conforming to the pressure distribution profile of said vortex and immersed in and coaxial with the vortex and axially inertially displaceable relative to the vortex in one direction or the other according as the element undergoes axial acceleration or deceleration,
   (c) and means responsive to such displacement for sensing the magnitude and direction of such displacement.

2. In an inertial sensor,
   (a) means providing a vortex,
   (b) an element having a face thereof directed towards said vortex and conforming to the pressure distribution profile of said vortex and immersed in and coaxial with the vortex and axially inertially displaceable relative to the vortex in one direction or the other according as the element undergoes axial acceleration or deceleration,
   (c) and means responsive to the change in vortex pressure resulting from such displacement for sensing the magnitude and direction of such displacement.

3. In an inertial sensor,
   (a) means providing a vortex,
   (b) a rotor having a face thereof directed towards said vortex and conforming to the pressure distribution profile of said vortex and immersed in and coaxial with and rotated by the vortex and being axially inertially displaceable relative to the vortex in one direction or the other according as the rotor undergoes axial acceleration or deceleration,
   (c) and means responsive to such displacement for sensing the magnitude and direction of such displacement.

4. In an inertial sensor,
   (a) means providing a constant speed vortex,
   (b) an element having a face thereof directed towards said vortex and conforming to the pressure distribution profile of said vortex and immersed in and coaxial with the vortex and axially inertially displaceable relative to the vortex in one direction or the other according as the element undergoes axial acceleration or deceleration,
   (c) and means responsive to such displacement for sensing the magnitude and direction of such displacement.

5. In an inertial sensor,
   (a) means providing a constant speed vortex,
   (b) an element having a face thereof directed towards said vortex and conforming to the pressure distribution profile of said vortex and immersed in and coaxial with the vortex and axially inertially displaceable relative to the vortex in one direction or the other according as the element undergoes axial acceleration or deceleration,
   (c) and means responsive to the change in vortex pressure resulting from such displacement for sensing the magnitude and direction of such displacement.

6. In an inertial sensor,
   (a) means providing a constant speed vortex,
   (b) a rotor having a face thereof directed towards said vortex and conforming to the pressure distribution profile of said vortex and immersed in and coaxial with and rotated by the vortex and being axially inertially displaceable relative to the vortex in one direction or the other according as the rotor undergoes axial acceleration or deceleration,
   (c) and means responsive to such displacement for sensing the magnitude and direction of such displacement.

7. In an inertial sensor,
   (a) a body having an internal circular space and an internal annular space coaxial and communicating with the circular space,
   (b) means for introducing gas tangentially at constant pressure into the annular space, whereby the gas will spiral in the annular space and form a vortex in the circular space,
   (c) and an element having a face thereof directed towards said vortex and conforming to the pressure distribution profile of said vortex and in and freely movable parallel to the axis of the circular space so as to be held by the vortex in an axially null position in the absence of at least a predetermined axial inertial force on the element.

8. In an inertial sensor,
   (a) a cup-like body having at its open end an internal circular space, said body having an internal annular space coaxial and communicating with the circular space,
   (b) means for introducing hot gas at constant pressure tangentially into the annular space, whereby the gas will spiral in the annular space and form a vortex in the circular space,
   (c) a support in fixed relation to the body,
   (d) and an element having a face thereof directed towards said vortex and conforming to the pressure distribution profile of said vortex and mounted on and rotatable and axially displaceable relative to the support,
   the element being coaxial with and immersed in the circular space so as to be rotated by the vortex and, in the absence of at least a predetermined axial inertial force on the element, to be held by the vortex in an axially null position.

9. The structure of claim 7, and fluid pressure responsive means communicating with a part of the vortex for sensing the magnitude and direction of any inertial axial movement of the element.

10. The structure of claim 7, and fluid pressure responsive means communicating with a radially extreme part of the vortex for sensing the magnitude and direction of any inertial axial movement of the element.

11. In an inertial sensor,
    (a) a cup, (b) a cone-shaped member in the cup, the base of the member being fixed to the base of the cup,
   the member being otherwise spaced from the cup, providing therebetween an annular space,
   the apex of the member being spaced from the open end of the cup, so that the space in the cup axially between the open end and the apex is circular,
(c) means for introducing gas at constant pressure tangentially into the annular space to form a vortex in the circular space,
(d) a support in fixed relation to the cup,
(e) an axially movable cone mounted on the support, with the apex of the cone in the circular space and spaced from the apex of said member,
   the cone being coaxial with the cup and converging toward the base of the cup,
(f) and means responsive to axial inertial displacement of the cone for sensing the magnitude and direction of displacement.

12. In an inertial sensor,
(a) a cup,
(b) a cone-shaped member in the cup,
   the base of the member being fixed to the base of the cup,
   the member being otherwise spaced from the cup, providing therebetween an annular space,
   the apex of the member being spaced from the open end of the cup, so that the space in the cup axially between the open end and the apex is circular,
(c) means for introducing gas at constant pressure tangentially into the annular space to form a vortex in the circular space,
(d) a support in fixed relation to the cup,
(e) an axially movable cone mounted on the support, with the apex of the cone in the circular space and spaced from the apex of said member,
   the cone being coaxial with the cup and converging toward the base of the cup,
   the cup base and said member having communicating bores providing together a passage from the center of the circular space to the outside of the cup,
(f) and means responsive to change in pressure at the center of the vortex resulting from axial inertial displacement of the cone for sensing the magnitude and direction of the displacement.

13. In an inertial sensor,
(a) means providing a vortex,
(b) said vortex having a pressure distribution profile, an element immersed in an coaxial with the vortex,
   said element being shaped to correspond substantially to said vortex pressure distribution profile,
   said element also being axially inertially displaceable relative ot the vortex in one direction or the other according as the element undergoes axial acceleration or deceleration,
(c) and means responsive to such displacement for sensing the magnitude and direction of such displacement.

References Cited by the Examiner
UNITED STATES PATENTS

| | | | |
|---|---|---|---|
| 2,359,927 | 10/44 | Melas | 73—501 |
| 3,028,760 | 4/62 | Diamond | 73—516 |
| 3,048,042 | 8/62 | Pope | 73—516 |
| 3,080,761 | 3/63 | Speen | 73—516 |

RICHARD C. QUEISSER, *Primary Examiner.*

JAMES J. GILL, *Examiner.*